(12) United States Patent
Mizufune et al.

(10) Patent No.: US 9,751,048 B2
(45) Date of Patent: Sep. 5, 2017

(54) DEHUMIDIFYING DEVICE AND DEHUMIDIFYING MODULE

(71) Applicant: NABTESCO CORPORATION, Tokyo (JP)

(72) Inventors: Toru Mizufune, Hyogo (JP); Masaru Kuromitsu, Hyogo (JP); Akira Takahashi, Hyogo (JP); Tatsuo Miyauchi, Hyogo (JP)

(73) Assignee: NABTESCO CORPORATION, Tokyo (JP)

( * ) Notice: Subject to any disclaimer, the term of this patent is extended or adjusted under 35 U.S.C. 154(b) by 51 days.

(21) Appl. No.: 14/742,111

(22) Filed: Jun. 17, 2015

(65) Prior Publication Data
US 2015/0375171 A1 Dec. 31, 2015

(30) Foreign Application Priority Data

Jun. 30, 2014 (JP) ................................ 2014-134412

(51) Int. Cl.
*B01D 53/22* (2006.01)
*B01D 63/04* (2006.01)
(Continued)

(52) U.S. Cl.
CPC ........... *B01D 63/04* (2013.01); *B01D 53/268* (2013.01); *B60T 17/004* (2013.01); *B61H 13/34* (2013.01);
(Continued)

(58) Field of Classification Search
CPC B01D 2319/02; B01D 2317/02; B01D 63/04; B01D 53/268; F24F 3/14; F24F 2003/1435; B60T 17/004; B61H 13/34
See application file for complete search history.

(56) References Cited

U.S. PATENT DOCUMENTS 1,808,982 A 6/1931 Harris
4,002,040 A * 1/1977 Munters ................ F24F 5/0007
261/153

(Continued)

FOREIGN PATENT DOCUMENTS

CN 101846369 A 9/2010
JP 2006-308152 A 11/2006
(Continued)

OTHER PUBLICATIONS

Extended European Search Report as issued in European Patent Application No. 15174409.1, dated May 17, 2016, 8 pages.

*Primary Examiner* — Anthony Shumate
(74) *Attorney, Agent, or Firm* — Pillsbury Winthrop Shaw Pittman LLP (57) ABSTRACT

The present application discloses a dehumidifying device including a base configured to define an inlet channel for first air flow, and an outlet channel for second air flow less humid than the first; and a first dehumidifier including a first inlet and outlet in communication with the inlet and outlet channel, and configured to dehumidify the first air between the first inlet and the first outlet to generate the second air. The base includes a first base portion configured to define first inlet and outlet regions for the first and second air flows; and a second base portion configured to define second inlet and outlet regions in communication with the first inlet and outlet regions. The first and second inlet regions form at least a part of the inlet channel. The first and second outlet regions form at least a part of the outlet channel.

8 Claims, 6 Drawing Sheets

(51) Int. Cl.
  *B01D 53/26* (2006.01)
  *B61H 13/34* (2006.01)
  *F24F 3/14* (2006.01)
  *B60T 17/00* (2006.01)

(52) U.S. Cl.
  CPC ........ *F24F 3/14* (2013.01); *F24F 2003/1435* (2013.01)

(56) References Cited

U.S. PATENT DOCUMENTS

| | | | | |
|---|---|---|---|---|
| 4,171,017 A * | 10/1979 | Klass | B01D 53/22 | 166/266 |
| 4,685,941 A * | 8/1987 | Sato | B01D 53/261 | 96/114 |
| 5,104,535 A * | 4/1992 | Cote | B01D 63/021 | 210/321.8 |
| 5,162,101 A * | 11/1992 | Cosentino | A61M 1/1698 | 128/DIG. 3 |
| 5,334,230 A * | 8/1994 | Sloka | B60T 17/004 | 96/113 |
| 5,468,283 A * | 11/1995 | French | B01D 53/22 | 95/45 |
| 6,113,782 A * | 9/2000 | Leonard | B01D 63/022 | 210/321.61 |
| 6,126,724 A * | 10/2000 | Martin | B01D 46/0087 | 95/52 |
| 6,370,887 B1 * | 4/2002 | Hachimaki | B01D 53/261 | 62/272 |
| 6,581,297 B1 * | 6/2003 | Ginder | B60T 17/004 | 34/79 |
| 6,923,845 B2 * | 8/2005 | Nichols | B60T 17/004 | 95/273 |
| 2004/0094036 A1 * | 5/2004 | Nichols | B01D 53/261 | 95/148 |
| 2005/0031531 A1 * | 2/2005 | Stein | B01D 53/22 | 423/579 |
| 2005/0191530 A1 * | 9/2005 | Mossman | B01D 53/268 | 429/414 |
| 2005/0284293 A1 * | 12/2005 | Rubas | B01D 53/22 | 96/8 |
| 2007/0259235 A1 * | 11/2007 | Jacobson | B01D 53/22 | 429/458 |
| 2008/0087168 A1 * | 4/2008 | Wright | B01D 53/22 | 96/134 |
| 2010/0031817 A1 * | 2/2010 | Ehrenberg | F24F 5/0035 | 95/52 |
| 2010/0089239 A1 * | 4/2010 | Wright | B01D 53/22 | 96/6 |
| 2012/0181712 A1 * | 7/2012 | Vanderwees | H01M 8/04074 | 261/102 |
| 2013/0168307 A1 * | 7/2013 | Drivarbekk | B01D 63/04 | 210/321.69 |
| 2014/0041833 A1 | 2/2014 | Breshears | | |
| 2014/0054013 A1 * | 2/2014 | LePoudre | F28F 9/026 | 165/104.19 |
| 2014/0238235 A1 * | 8/2014 | Liu | B01D 53/268 | 95/52 |
| 2015/0300664 A1 | 10/2015 | Nakayama et al. | | |

FOREIGN PATENT DOCUMENTS

| | | |
|---|---|---|
| JP | 3150077 U | 4/2009 |
| JP | 5521106 B1 | 6/2014 |

* cited by examiner

DEHUMIDIFYING DEVICE AND DEHUMIDIFYING MODULE

BACKGROUND OF THE INVENTION

Field of the Invention

The present invention relates to a dehumidifying device for dehumidifying the air, and a dehumidifying module for use in the dehumidifying device.

Description of the Related Art

Japanese Utility Model Registration No. 3150077 (hereinafter, called as Patent Document 1) discloses a dehumidifying device for dehumidifying compressed air which causes a braking force in a railway vehicle. In Patent Document 1, the air compressed by an air compression unit is cooled by an after-cooler. After the compressed air is cooled, the compressed air is dehumidified by the dehumidifying device, and the compressed air after the dehumidification is stored in a compressed air tank.

Figure 3:
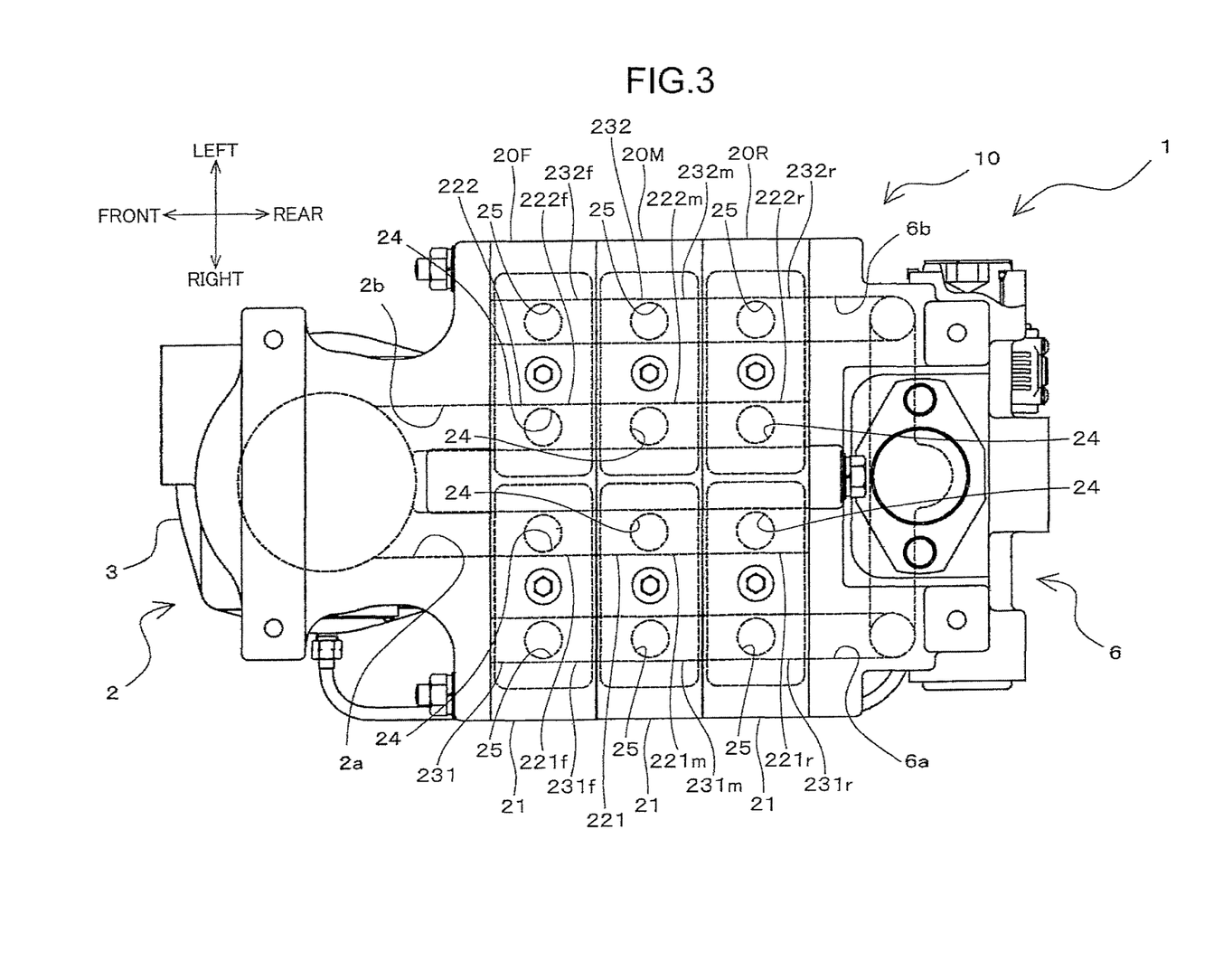
FIG. 3 is a schematic plan view of the dehumidifying device shown in FIG. 1.

FIG. 3 of Patent Document 1 discloses a columnar dehumidifying device. The size (length and diameter) of the dehumidifying device is determined to meet required dehumidification performance. If there is a change in the required dehumidification performance for the dehumidifying device, a designer has to redesign the dehumidifying device. This means that a variety of the dehumidification performance required for a dehumidifying device results in an increase in types of dehumidifying devices. Consequently, a manufacturer has to put a lot of efforts for production control of dehumidifying devices.

If the maximum dehumidification performance among the requirements for dehumidifying devices is given to all the types of dehumidifying devices, there may be a decrease in the efforts for the production control of dehumidifying devices. In this case, however, the dehumidifying devices may be oversized unnecessarily.

An object of the present invention is to provide techniques for easily changing a design of a dehumidifying device so as to meet dehumidification performance requirement from a user using the dehumidifying device.

SUMMARY OF THE INVENTION

A dehumidifying device according to one aspect of the present invention includes a base configured to define an inlet channel, through which first air flows, and an outlet channel, through which second air less humid than the first air flows; and a first dehumidifier including a first inlet in communication with the inlet channel and a first outlet in communication with the outlet channel, the first dehumidifier dehumidifying the first air between the first inlet and the first outlet to generate the second air. The base includes a first base portion configured to define a first inlet region, through which the first air flows, and a first outlet region, through which the second air flows; and a second base portion configured to define a second inlet region in communication with the first inlet region and a second outlet region in communication with the first outlet region. The first and second inlet regions form at least a part of the inlet channel. The first and second outlet regions form at least a part of the outlet channel.

A dehumidifying module according to another aspect of the present invention is connectable to another base portion which defines channels through which air flows. The dehumidifying module includes a base portion configured to define an inlet region, through which first air flows, and an outlet region, through which second air less humid than the first air flows; and a first dehumidifier including a first inlet in communication with the inlet region and a first outlet in communication with the outlet region, the first dehumidifier dehumidifying the first air between the first inlet and the first outlet to generate the second air. The inlet region communicates with one of the channels to partially define an inlet channel, through which the first air flows, and the outlet region communicates with another of the channels to define an outlet channel, through which the second air flows, when the base portion is connected to the other base portion.

The aforementioned techniques allow an easy design change of a dehumidifying device so as to meet dehumidification performance requirement from a user using the dehumidifying device.

These and other objects, features and advantages of the present invention will become more apparent upon reading the following detailed description along with the accompanying drawings.

DETAILED DESCRIPTION OF THE PREFERRED EMBODIMENT

An exemplificative dehumidifying device is described with reference to the drawings. In the following description, a dehumidifying device is used for dehumidifying compressed air for use in a railway vehicle. The dehumidifying device, however, may be used for other applications. The following principle of the dehumidifying device is not limited to a specific application of the dehumidifying device.

[Overall Configuration]

Figure 1:
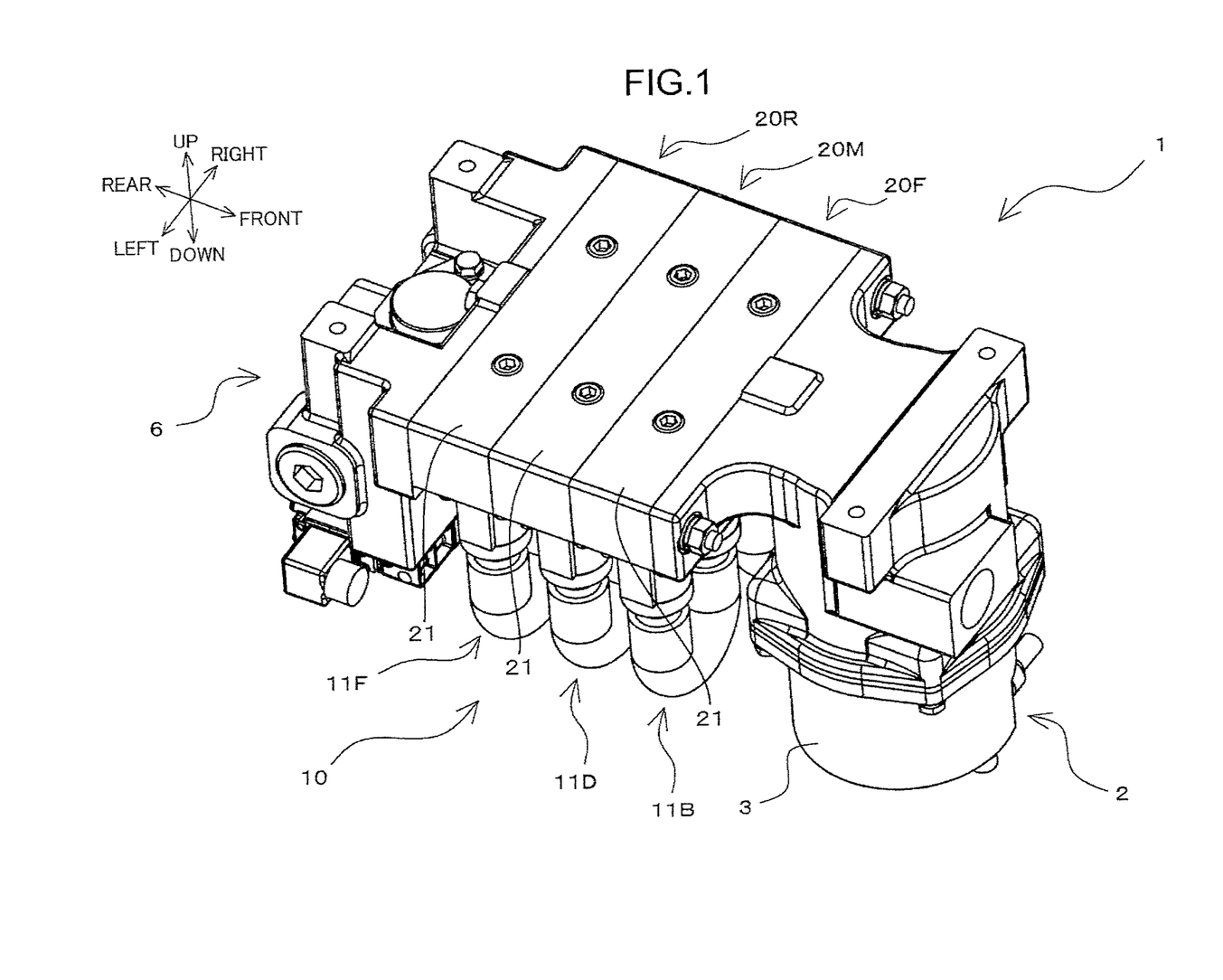
FIG. 1 is a schematic perspective view of an exemplificative dehumidifying device.
Figure 2:
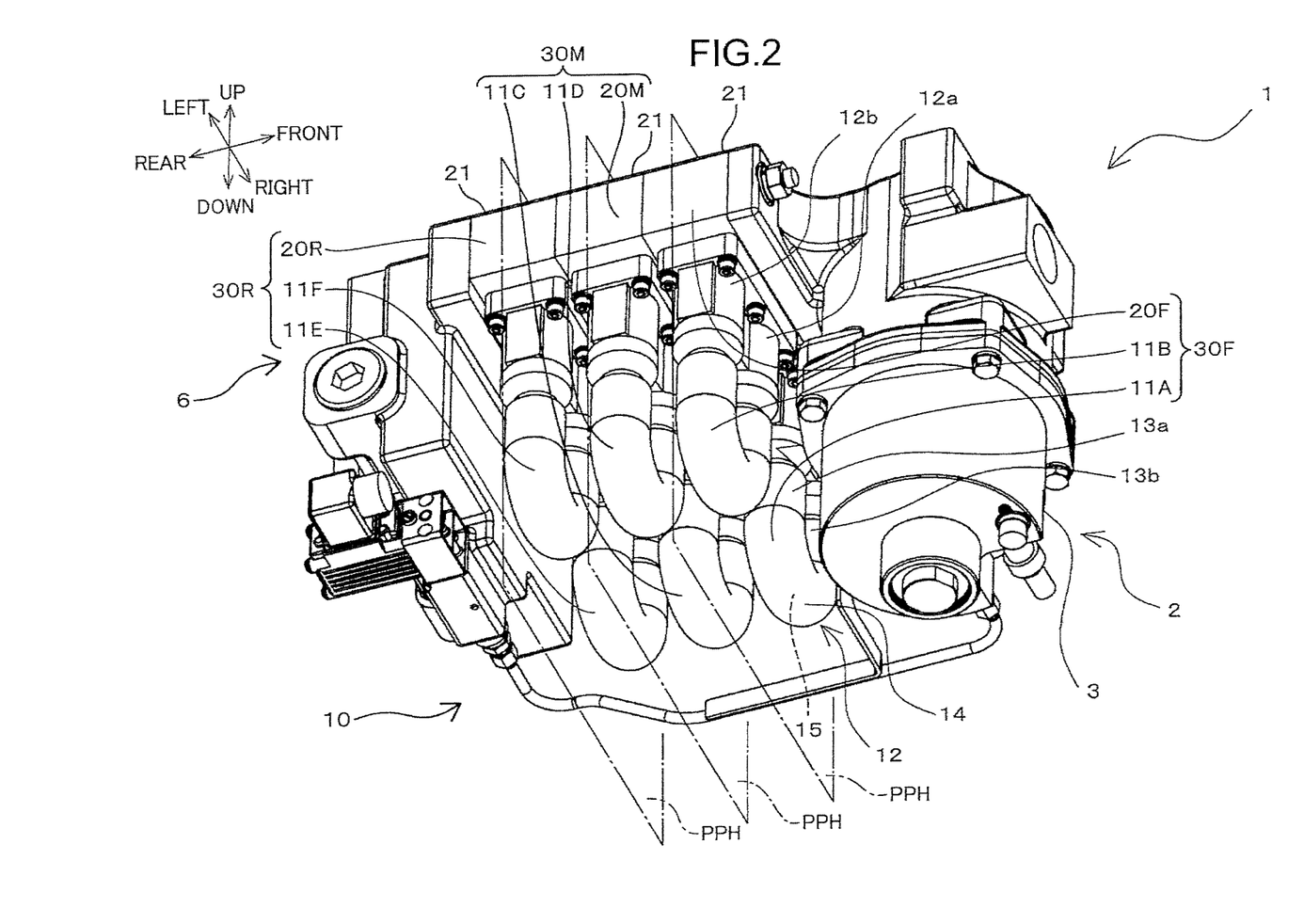
FIG. 2 is another schematic perspective view of the dehumidifying device shown in FIG. 1.
Figure 4:
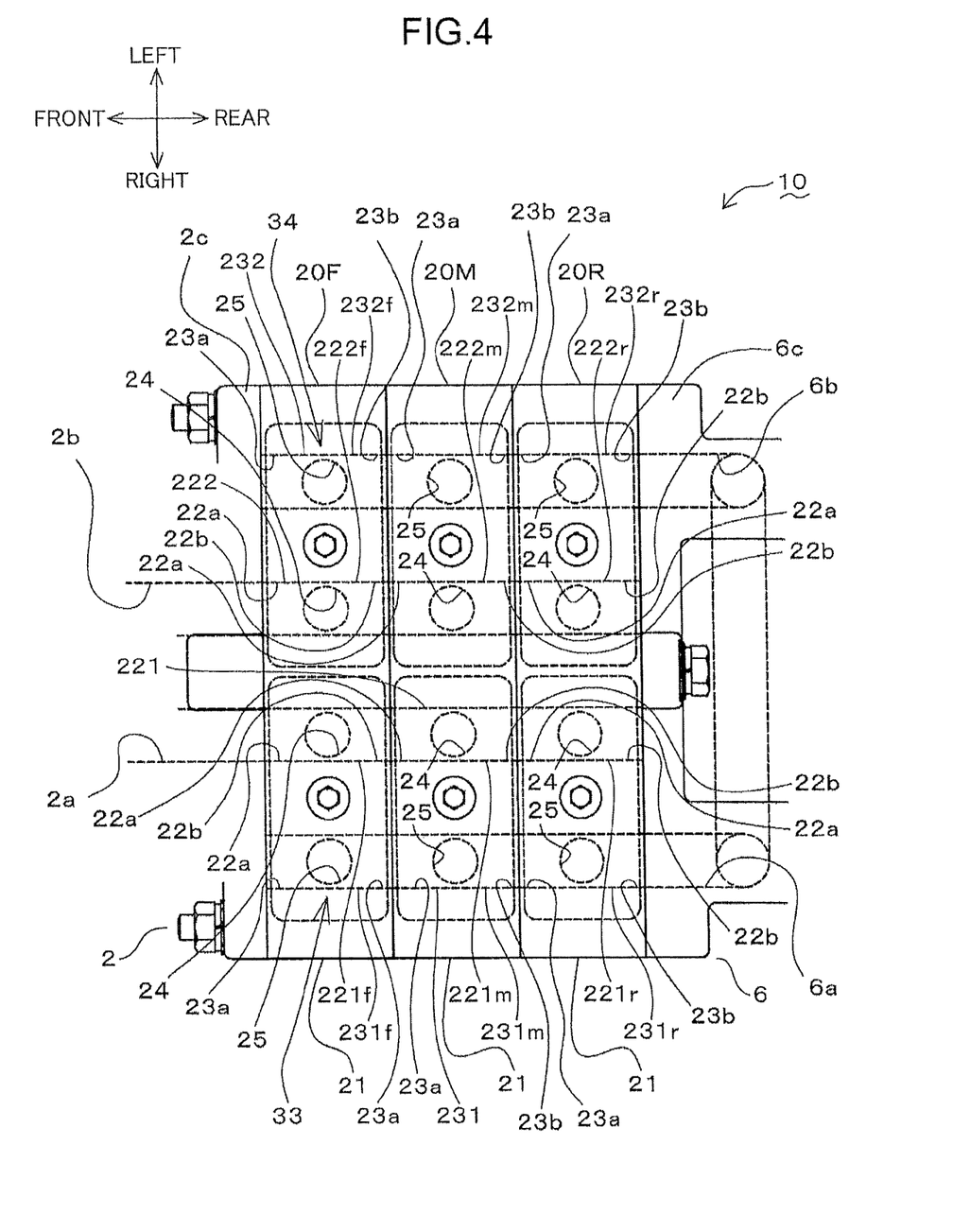
FIG. 4 is a schematic enlarged view of the dehumidifying device shown in FIG. 3 around a dehumidifying unit.
Figure 5:
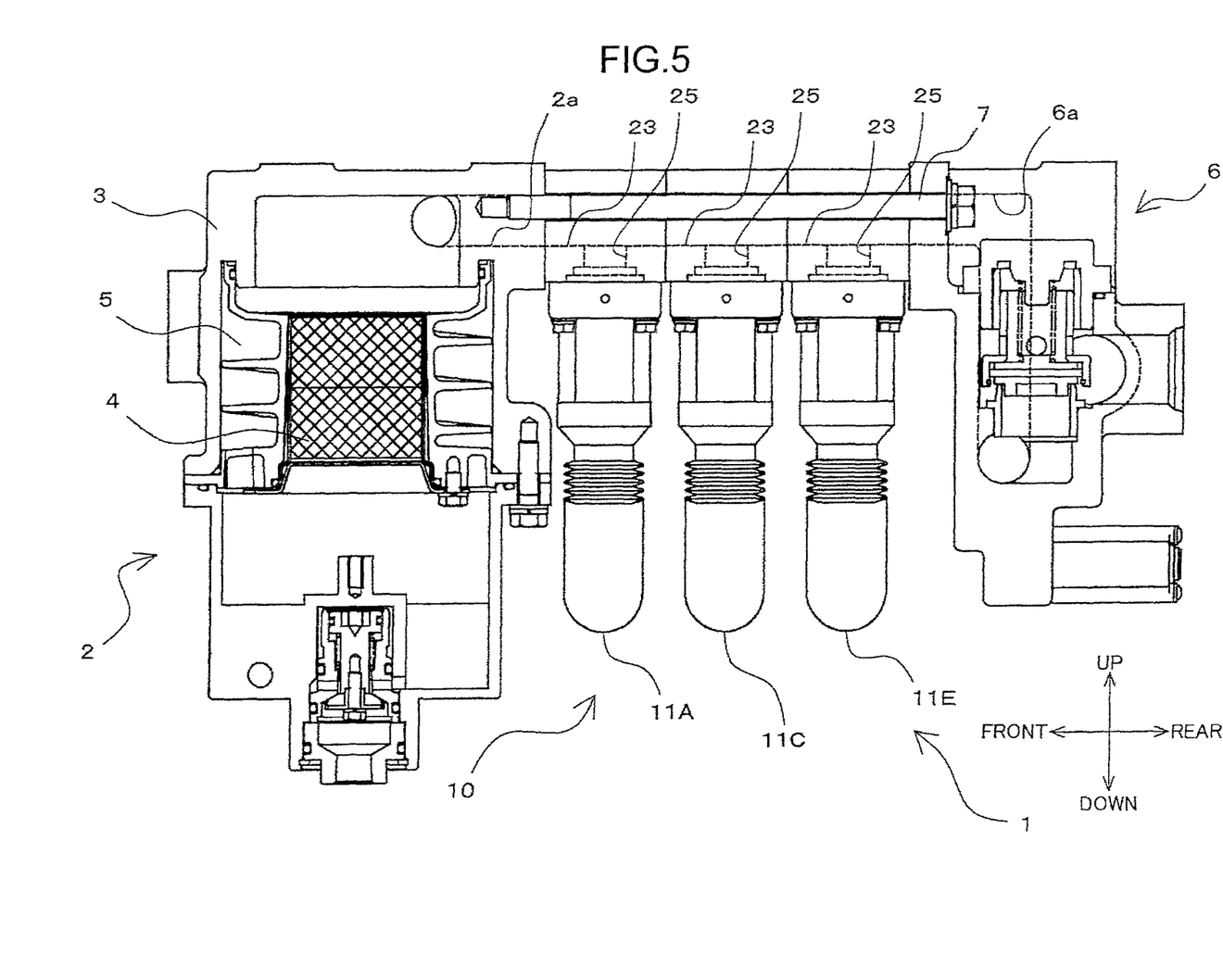
FIG. 5 is a schematic right side view of the dehumidifying device shown in FIG. 1.

FIGS. 1 and 2 are schematic perspective views of an exemplificative dehumidifying device 1. FIG. 1 mainly shows an upper portion of the dehumidifying device 1. FIG. 2 mainly shows a lower portion of the dehumidifying device 1. FIG. 3 is a schematic plan view of the dehumidifying device 1. FIG. 4 is a schematic enlarged view of the dehumidifying device 1 shown in FIG. 3 around a dehumidifying unit 10. FIG. 5 is a schematic right side view of the dehumidifying device 1. A part of components is removed from the dehumidifying device 1 shown in FIG. 5. Therefore, FIG. 5 shows an internal structure of the dehumidifying device 1.

With regard to FIGS. 1 to 5, the direction of the arrow with the term "FRONT" is called as front side or forward. The direction of the arrow with the term "REAR" is called as rear side or rearward. The direction of the arrow with the term "RIGHT" is called as right side or rightward. The direction of the arrow with the term "LEFT" is called as left side or leftward. The direction of the arrow with the term "UP" is called as upper side or upward. The direction of the arrow with the term "DOWN" is called as lower side or downward.

The dehumidifying device 1 is mounted onto a railway vehicle (not shown). The dehumidifying device 1 dehumidifies compressed air for use in causing a braking force which acts on the railway vehicle.

The compressed air is generated by an air compressor (not shown). The compressed air flows into the dehumidifying device 1. The compressed air which has dehumidified by the dehumidifying device 1 is stored in a compressed air tank (not shown) situated at the downstream of the dehumidifying device 1. The compressed air which has stored in the compressed air tank is used for generating the braking force of the railway vehicle.

As shown in FIGS. 1 to 5, the dehumidifying device 1 includes a separation device 2, the dehumidifying unit and a check valve 6. The dehumidifying unit 10 is connected to the separation device 2 and the check valve 6. The separation device 2 separates moisture and oil from the compressed air. The compressed air then flows into the dehumidifying unit 10. The dehumidifying unit 10 dehumidifies the compressed air. The compressed air after the dehumidification flows into the compressed air tank through the check valve 6. The check valve 6 prevents backflow of the compressed air. In the present embodiment, the separator is exemplified by the separation device 2. The first air is exemplified by the compressed air which flows from the separation device 2 into the dehumidifying unit 10.

As shown in FIG. 5, the separation device 2 includes a housing 3 and a separation processor 4. The separation processor 4 is situated in the housing 3. The housing 3 defines a spiral flow channel 5.

The compressed air flows in from an upper portion of the separation device 2, and then flows downward along the spiral flow channel 5. Thereafter, the compressed air flows into a lower portion of the separation processor 4, and then flows upward through the separation processor 4. At this time, the moisture and the oil in the compressed air are adhered to the separation processor 4. Consequently, the moisture and the oil are removed from the compressed air. The separation processor 4 may be an aluminum crusher (a fibrous mass of entangled aluminum fibers). The principle of the present embodiment is not limited to a specific structure of the separation processor 4.

When the compressed air passes through the separation device 2, a large part of moisture in the compressed air is removed from the compressed air. The compressed air is then dehumidified by the dehumidifying unit 10.

As shown in FIG. 3, the separation device 2 includes two outlets 2a, 2b. The compressed air which has passed through the separation processor 4 flows into the dehumidifying unit 10 through the outlets 2a, 2b.

As shown in FIG. 2, the dehumidifying unit 10 includes dehumidifiers 11 (11A to 11F). The dehumidifiers 11 are connected to each other. After the removal of the moisture and the oil from the compressed air by the separation device 2, the compressed air passes through the dehumidifying unit 10. Meanwhile, the compressed air is dehumidified by the dehumidifiers 11.

The compressed air dehumidified by the dehumidifying unit 10 is discharged from the dehumidifying device 1 through the check valve 6. On the other hand, the check valve 6 prevents a backflow of the compressed air into the dehumidifying device 1.

As shown in FIGS. 3 and 4, the check valve 6 includes two inlets 6a, 6b. The compressed air dehumidified by the dehumidifying unit 10 flows into the check valve 6 through each of the inlets 6a, 6b. After the compressed air passes through the check valve 6, the compressed air is stored in the compressed air tank. The check valve 6 may be a commercially available check valve. The principle of the present embodiment is not limited to a specific structure of the check valve 6.

[Configuration of Dehumidifying Unit]

As shown in FIG. 2, the dehumidifying unit 10 includes dehumidifying modules 30F, 30M, 30R. Each of the dehumidifying modules 30F, 30M, 30R includes the two dehumidifiers 11 and a base portion 20. The dehumidifying modules 30F, 30M, 30R may be the same in shape, structure and size. Therefore, the description about one of the dehumidifying modules 30F, 30M, 30R is applicable to the other dehumidifying modules.

The principle of the present embodiment is also applicable to a dehumidifying device including two dehumidifying modules. The principle of the present embodiment is also applicable to a dehumidifying device including four or more dehumidifying modules. Therefore, the principle of the present embodiment is not limited by how many dehumidifying modules are incorporated in a dehumidifying device.

As shown in FIG. 1, the base portion 20 of the dehumidifying module 30F is called as the base portion 20F in the following description. The base portion 20 of the dehumidifying module 30M is called as the base portion 20M. The base portion 20 of the dehumidifying module 30R is called as the base portion 20R. The base portion 20M is situated between the base portions 20F, 20R. In the present embodiment, the base is exemplified as a group of the base portions 20M, 20F, 20R.

As shown in FIG. 2, in the following description, the two dehumidifiers 11 mounted on the base portion 20F are called as the dehumidifiers 11A, 11B. The two dehumidifiers 11 mounted on the base portion 20M are called as the dehumidifiers 11C, 11D. The two dehumidifiers 11 mounted on the base portion 20R are called as the dehumidifiers 11E, 11F.

The dehumidifiers 11A to 11F may be the same in shape, structure and size. As shown in FIG. 2, each of the dehumidifiers 11A to 11F includes a housing 12 and hollow fiber membranes 15. The hollow fiber membranes 15 are stored in the housing 12.

As shown in FIG. 2, the housing 12 is formed into a tubular shape. The housing 12 includes two straight portions 13a, 13b and a curved portion 14. The curved portion 14 is integrally formed with the straight portions 13a, 13b. Each of the straight portions 13a, 13b is a linearly extending tubular member. The straight portion 13a is distant from the straight portion 13b. The straight portion 13a extends substantially in parallel to the straight portion 13b. The curved portion 14 is formed into a U-shape. The curved portion 14 includes an end integrally formed with the straight portion 13a and the other end integrally formed with the straight portion 13b.

The housing 12 includes an inlet 12a and an outlet 12b. The compressed air flows into the housing 12 through the inlet 12a. The compressed air is then discharged from the housing 12 through the outlet 12b. While the compressed air flows from the inlet 12a to the outlet 12b, the compressed air is dehumidified. In the present embodiment, the second air is exemplified by the compressed air to be discharged through the outlet 12b.

As shown in FIG. 3, the base portion 20F is formed with two inner through-holes 221f, 222f and two outer through-holes 231f, 232f. The inner through-holes 221f, 222f are situated between the outer through-holes 231*f*, 232*f*. The inner through-hole 221*f* is situated between the inner and outer through-holes 222*f*, 231*f*. The inner through-hole 222*f* is situated between the inner and outer through-holes 221*f*, 232*f*.

As shown in FIG. 3, the base portion 20M is formed with two inner through-holes 221*m*, 222*m* and two outer through-holes 231*m*, 232*m*. The inner through-holes 221*m*, 222*m* are situated between the outer through-holes 231*m*, 232*m*. The inner through-hole 221*m* is situated between the inner and outer through-holes 222*m*, 231*m*. The inner through-hole 222*m* is situated between the inner and outer through-holes 221*m*, 232*m*.

As shown in FIG. 3, the base portion 20R is formed with two inner through-holes 221*r*, 222*r* and two outer through-holes 231*r*, 232*r*. The inner through-holes 221*r*, 222*r* are situated between the outer through-holes 231*r*, 232*r*. The inner through-hole 221*r* is situated between the inner and outer through-holes 222*r*, 231*r*. The inner through-hole 222*r* is situated between the inner and outer through-holes 221*r*, 232*r*.

As shown in FIG. 3, when the base portions 20F, 20M, 20R are connected to each other, the linearly aligned inner through-holes 221*f*, 221*m*, 221*r* form an inlet channel 221. When the base portions 20F, 20M, 20R are connected to each other, the linearly aligned inner through-holes 222*f*, 222*m*, 222*r* form an inlet channel 222. When the base portions 20F, 20M, 20R are connected to each other, the linearly aligned outer through-holes 231*f*, 231*m*, 231*r* form an outlet channel 231. When the base portions 20F, 20M, 20R are connected to each other, the linearly aligned outer through-holes 232*f*, 232*m*, 232*r* form an outlet channel 232.

The inlet 12*a* of the housing 12 of the dehumidifier 11A is connected to the inner through-hole 221*f* of the base portion 20F whereas the outlet 12*b* of the housing 12 of the dehumidifier 11A is connected to the outer through-hole 231*f*. The inlet 12*a* of the housing 12 of the dehumidifier 11B is connected to the inner through-hole 222*f* of the base portion 20F. Since the housing 12 is curved by the U-shaped curved portion 14, the outlet 12*b* of the housing 12 of the dehumidifier 11B is connected to the outer through-hole 232*f*. Therefore, the compressed air may smoothly flow from the inlet 12*a* to the outlet 12*b*.

The inlet 12*a* of the housing 12 of the dehumidifier 11C is connected to the inner through-hole 221*m* of the base portion 20M whereas the outlet 12*b* of the housing 12 of the dehumidifier 11C is connected to the outer through-hole 231*m*. The inlet 12*a* of the housing 12 of the dehumidifier 11D is connected to the inner through-hole 222*m* of the base portion 20M. Since the housing 12 is curved by the U-shaped curved portion 14, the outlet 12*b* of the housing 12 of the dehumidifier 11D is connected to the outer through-hole 232*m*. Therefore, the compressed air may smoothly flow from the inlet 12*a* to the outlet 12*b*.

The inlet 12*a* of the housing 12 of the dehumidifier 11E is connected to the inner through-hole 221*r* of the base portion 20R whereas the outlet 12*b* of the housing 12 of the dehumidifier 11E is connected to the outer through-hole 231*r*. The inlet 12*a* of the housing 12 of the dehumidifier 11F is connected to the inner through-hole 222*r* of the base portion 20F. Since the housing 12 is curved by the U-shaped curved portion 14, the outlet 12*b* of the housing 12 of the dehumidifier 11F is connected to the outer through-hole 232*r*. Therefore, the compressed air may smoothly flow from the inlet 12*a* to the outlet 12*b*.

Each of the hollow fiber membranes 15 in the housing 12 includes two ends having openings. The compressed air flows into one end of the hollow fiber membrane 15 and flows out from the other end. Meanwhile, moisture in the compressed air is exhausted from each of the hollow fiber membranes 15 through a membrane portion extending between the two ends. Therefore, the compressed air is appropriately dehumidified.

The hollow fiber membranes 15 are placed in the housing 12 in parallel. One end of each of the hollow fiber membranes 15 is opened toward one of the inlet channels 221, 222 at the inlet 12*a*. The other end of each of the hollow fiber membranes 15 is opened toward one of the outlet channels 231, 232 at the outlet 12*b*. Therefore, the compressed air which has flowed through the inlet 12*a* is dehumidified by the hollow fiber membranes 15 before arrival at the outlet 12*b*. The compressed air is then exhausted to the outlet channels 231, 232.

As shown in FIGS. 1 and 3, each of the base portions 20 includes a substantially rectangular block portion 21. The block portion 21 extends in the left and right directions. The inner through-holes 221*f*, 221*m*, 221*r*, 222*f*, 222*m*, 222*r* and the outer through-holes 231*f*, 231*m*, 231*r*, 232*f*, 232*m*, 232*r* are formed in the block portions 21. The inlet channels 221, 222 formed by the communicated inner through-holes 221*f*, 221*m*, 221*r*, 222*f*, 222*m*, 222*r* extend in the front and rear directions. Likewise, the outlet channels 231, 232 formed by the communicated outer through-holes 231*f*, 231*m*, 231*r*, 232*f*, 232*m*, 232*r* also extend in the front and rear directions. The inlet channels 221, 222 and the outlet channels 231, 232 align with each other in the left and right directions.

The compressed air passing through the separation device 2 flows into the inlet channels 221, 222 formed between the outlet channels 231, 232. The compressed air then flows into the outlet channels 231, 232 through the hollow fiber membranes 15 in the housing 12.

In the following description, the front end of each of the inner through-holes 221*f*, 221*m*, 221*r*, 222*f*, 222*m*, 222*r* is called as the inlet 22*a*. The rear end of each of the inner through-holes 221*f*, 221*m*, 221*r*, 222*f*, 222*m*, 222*r* is called as the outlet 22*b*.

Likewise, in the following description, the front end of each of the outer through-holes 231*f*, 231*m*, 231*r*, 232*f*, 232*m*, 232*r* is called as the inlet 23*a*. The rear end of each of the outer through-holes 231*f*, 231*m*, 231*r*, 232*f*, 232*m*, 232*r* is called as the outlet 23*b*.

As shown in FIG. 4, the inlet 22*a* of each of the inner through-holes 221*f*, 222*f* of the base portion 20F communicates with the separation device 2. The outlet 22*b* of each of the inner through-holes 221*f*, 222*f* of the base portion 20F communicates with the inlet 22*a* of each of the inner through-holes 221*m*, 222*m* of the base portion 20M. The inlet 23*a* of each of the outer through-holes 231*f*, 232*f* of the base portion 20F is blocked by the separation device 2. On the other hand, the outlet 23*b* of each of the outer through-holes 231*f*, 232*f* of the base portion 20F communicates with the inlet 23*a* of each of the outer through-holes 231*m*, 232*m* of the base portion 20M. In the present embodiment, the first base portion is exemplified by the base portion 20F. The first inlet region is exemplified by one of the inner through-holes 221*f*, 222*f*. The first outlet region is exemplified by one of the outer through-holes 231*f*, 232*f*. The first downstream opening is exemplified by the outlet 22*b* of one of the inner through-holes 221*f*, 222*f*. The second downstream opening is exemplified by the inlet 22*a* of one of the outer through-holes 231*f*, 232*f*. The first upstream opening is exemplified by the inlet 22*a* of one of the inner through-holes 221*m*, 222*m*. The second upstream opening is exemplified by the inlet 23*a* of one of the outer through-holes 231*m*, 232*m*. The first dehumidifier is exemplified by one of the dehumidifiers 11A, 11B. The first inlet is exemplified by the inlet 12a of one of the dehumidifiers 11A, 11B. The first outlet is exemplified by the outlet 12b of one of the dehumidifiers 11A, 11B.

As shown in FIG. 4, the outlet 22b of each of the inner through-holes 221m, 222m of the base portion 20M communicates with the inlet 22a of each of the inner through-holes 221r, 222r of the base portion 20R. The outlet 23b of each of the outer through-holes 231m, 232m of the base portion 20M communicates with the inlet 23a of each of the outer through-holes 231r, 232r of the base portion 20R. In the present embodiment, the second or third base portion may be exemplified by the base portion 20M. The second inlet region may be exemplified by one of the inner through-holes 221m, 222m. The second outlet region may be exemplified by one of the outer through-holes 231m, 232m. The second dehumidifier is exemplified by one of the dehumidifiers 11C, 11D. The second inlet is exemplified by the inlet 12a of one of the dehumidifiers 11C, 11D. The second outlet is exemplified by the outlet 12b of one of the dehumidifiers 11C, 11D.

As shown in FIG. 4, the outlet 22b of each of the inner through-holes 221r, 222r of the base portion 20R is blocked by the check valve 6. On the other hand, the outlet 22b of each of the outer through-holes 231m, 232m of the base portion 20R communicates with the check valve 6. In the present embodiment, the second base portion may be exemplified by the base portion 20R. In this case, the third base portion is exemplified by the base portion 20M.

As shown in FIG. 4, two holes 24 and two holes 25 are formed in each of the block portions 21. One of the two holes 24 communicates with one of the inlet channel 221, 222. The other of the two holes 24 communicates with the other of the inlet channels 221, 222. One of the two holes 25 communicates with one of the outlet channels 231, 232. The other of the two holes 25 communicates with the other of the outlet channels 231, 232.

FIG. 2 conceptually shows three imaginary planes PPH orthogonal to the inlet channels 221, 222 and the outlet channels 231, 232. Each of the dehumidifiers 11A to 11F extends downward from the holes 24, 25 along one of the three imaginary planes PPH.

As shown in FIG. 4, the base portions 20F, 20M, 20R are aligned with each other in the front and rear directions. Meanwhile, the inner through-holes 221f, 221m, 221r communicate with each other to form the inlet channel 221. The inner through-holes 222f, 222m, 222r communicate with each other to form the inlet channel 222. The outer through-holes 231f, 231m, 231r communicate with each other to form the outlet channel 231. The outer through-holes 232f, 232m, 232r communicate with each other to form the outlet channel 232.

The outlet 22b of the inner through-hole 221f is brought into firm contact with the inlet 22a of the inner through-hole 221m with a seal member or a gasket. The outlet 22b of the inner through-hole 221m is brought into firm contact with the inlet 22a of the inner through-hole 221r with a seal member or a gasket.

The outlet 22b of the inner through-hole 222f is brought into firm contact with the inlet 22a of the inner through-hole 222m with a seal member or a gasket. The outlet 22b of the inner through-hole 222m is brought into firm contact with the inlet 22a of the inner through-hole 222r with a seal member or a gasket.

The outlet 23b of the outer through-hole 231f is brought into firm contact with the inlet 23a of the outer through-hole 231m with a seal member or a gasket. The outlet 23b of the outer through-hole 231m is brought into firm contact with the inlet 23a of the outer through-hole 231r with a seal member or a gasket.

The outlet 23b of the outer through-hole 232f is brought into firm contact with the inlet 23a of the outer through-hole 232m with a seal member or a gasket. The outlet 23b of the outer through-hole 232m is brought into firm contact with the inlet 23a of the outer through-hole 232r with a seal member or a gasket.

As shown in FIG. 4, the separation device 2 includes a wall portion 2c. The wall portion 2c air-tightly blocks the two inlets 23a formed in the base portion 20F with a seal member (not shown). The check valve 6 includes a wall portion 6c. The wall portion 6c air-tightly blocks the two outlets 22b formed in the base portion 20R with a seal member (not shown).

Each of the dehumidifiers 11A, 11B is fixedly mounted on the base portion 20F. Each of the dehumidifiers 11C, 11D is fixedly mounted on the base portion 20M. Each of the dehumidifiers 11E, 11F is fixedly mounted on the base portion 20R. The dehumidifiers 11A to 11F may be connected to the base portions 20F, 20M, 20R by bolts. Alternatively, the dehumidifiers 11A to 11F may be fixedly mounted on the base portions 20F, 20M, 20R by another appropriate fastening member.

As described above, the dehumidifying unit 10 is situated between the separation device 2 and the check valve 6. Meanwhile, the inlets 22a of the base portion 20F communicate with the separation device 2. The outlets 23b of the base portion 20R are connected to the check valve 6. The check valve 6 allows for the compressed air to flow from the outlets 23b toward the check valve 6. On the other hand, the check valve 6 blocks the compressed air from flowing back from the check valve 6 to the outlets 23b. In the present embodiment, the first direction is exemplified by the flow direction of the compressed air flowing from the outlets 23b toward the check valve 6. The second direction is exemplified by the flow direction of the compressed air flowing back from the check valve 6 to the outlets 23b. The upstream opening is exemplified by the inlets 22a of the base portion 20F. The downstream opening is exemplified by the outlets 23b of the base portion 20R.

As shown in FIG. 5, the dehumidifying device 1 includes two fastening screws 7. Each of the fastening screws 7 includes a tip end having a male screw portion. The fastening screws 7 extend through the check valve 6 and the dehumidifying unit 10. The male screw portion formed on the tip end of each of the fastening screws 7 engages in a female screw portion formed in the separation device 2. Consequently, the separation device 2, the base portions 20F, 20M, 20R and the check valve 6 are tightly fastened to each other.

[Flow of Compressed Air in Dehumidifying Device]

The compressed air generated in the air compressor flows into the separation device 2. The compressed air passes through the spiral flow channel 5 described with reference to FIG. 5, and then flows into the separation processor 4. Meanwhile, oil and moisture contained in the compressed air are removed. The compressed air then flows into the dehumidifying unit 10 through the outlets 2a, 2b of the separation device 2.

Figure 6:
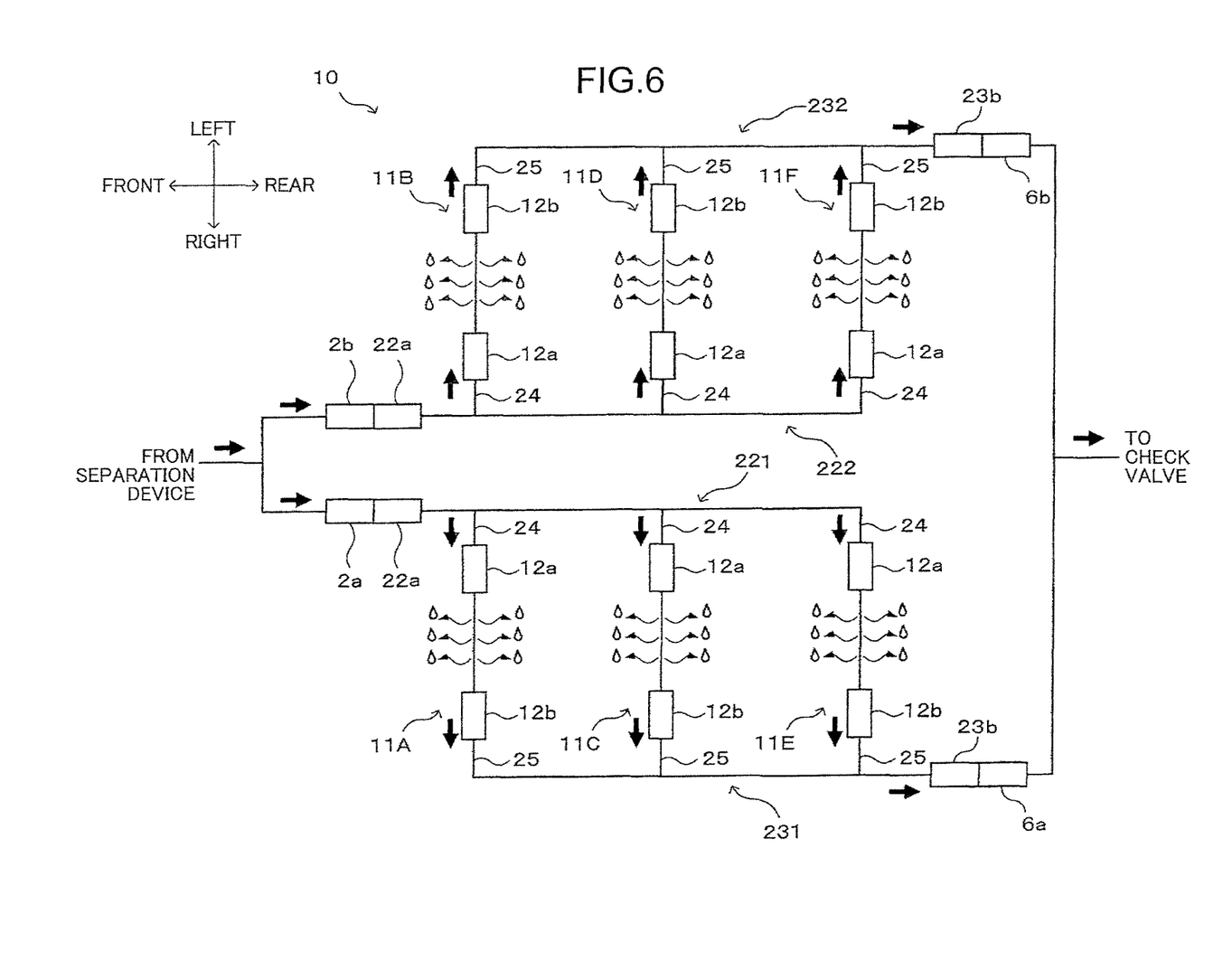
FIG. 6 is a schematic view showing a flow channel of compressed air flowing through the dehumidifying unit illustrated in FIG. 4.

FIG. 6 is a schematic view of a flow channel of the compressed air in the dehumidifying unit 10. The bold arrows in FIG. 6 conceptually represent flows of the compressed air. The compressed air passing through the separation device 2 is split into a flow directing toward the outlet 2a and a flow directing toward the outlet 2b. The compressed air directing toward the outlet 2a flows into the inlet 22a of the base portion 20F (the upstream end of the inlet channel 221). The compressed air directing toward the outlet 2b flows into the inlet 22a of the base portion 20F (the upstream end of the inlet channel 222).

Each of the base portions 20F, 20M, 20R is formed with the corresponding hole 24 in communication with the inlet channel 221. A part of the compressed air which has flowed into the inlet channel 221 through the inlet 22a of the base portion 20F enters the inlet 12a of the dehumidifier 11A through the hole 24 of the base portion 20F. The dehumidifier 11A then dehumidifies the compressed air. Another part of the compressed air which has flowed into the inlet channel 221 enters the inlet 12a of the dehumidifier 11C through the hole 24 of the base portion 20M. The dehumidifier 11C then dehumidifies the compressed air. The rest part of the compressed air which has flowed into the inlet channel 221 enters the inlet 12a of the dehumidifier 11E through the hole 24 of the base portion 20R. The dehumidifier 11E then dehumidifies the compressed air.

Each of the base portions 20F, 20M, 20R is formed with the corresponding hole 25 in communication with the outlet channel 231. The compressed air dehumidified by the dehumidifier 11A flows into the outlet channel 231 through the outlet 12b of the dehumidifier 11A and the hole 25 formed in the base portion 20F. The compressed air dehumidified by the dehumidifier 11C flows into the outlet channel 231 through the outlet 12b of the dehumidifier 11C and the hole 25 formed in the base portion 20M. The compressed air dehumidified by the dehumidifier 11E flows into the outlet channel 231 through the outlet 12b of the dehumidifier 11E and the hole 25 formed in the base portion 20R. The compressed air then flows into the inlet 6a of the check valve 6 through the outlet 23b formed in the base portion 20R.

Each of the base portions 20F, 20M, 20R is formed with the corresponding hole 24 in communication with the inlet channel 222. A part of the compressed air which has flowed into the inlet channel 222 through the inlet 22a of the base portion 20F enters the inlet 12a of the dehumidifier 11B through the hole 24 of the base portion 20F. The dehumidifier 11B then dehumidifies the compressed air. Another part of the compressed air which has flowed into the inlet channel 222 enters the inlet 12a of the dehumidifier 11D through the hole 24 of the base portion 20M. The dehumidifier 11D then dehumidifies the compressed air. The rest part of the compressed air which has flowed into the inlet channel 222 enters the inlet 12a of the dehumidifier 11F through the hole 24 of the base portion 20R. The dehumidifier 11F then dehumidifies the compressed air.

Each of the base portions 20F, 20M, 20R is formed with the corresponding hole 25 in communication with the outlet channel 232. The compressed air dehumidified by the dehumidifier 11B flows into the outlet channel 232 through the outlet 12b of the dehumidifier 11B and the hole 25 formed in the base portion 20F. The compressed air dehumidified by the dehumidifier 11D flows into the outlet channel 232 through the outlet 12b of the dehumidifier 11D and the hole 25 formed in the base portion 20M. The compressed air dehumidified by the dehumidifier 11F flows into the outlet channel 231 through the outlet 12b of the dehumidifier 11F and the hole 25 formed in the base portion 20R. The compressed air then flows into the inlet 6b of the check valve 6 through the outlet 23b formed in the base portion 20R.

The compressed air discharged through the outlet channel 231 join the compressed air discharged through the outlet channel 232 in the check valve 6. The compressed air dehumidified by the dehumidifying unit 10 is fed further downstream through the check valve 6. The dehumidified compressed air is then stored in the compressed air tank (not shown).

[Effects]

The base portion 20F and the dehumidifiers 11A, 11B form the dehumidifying module 30F. The base portion 20F is connected to the other base portions (base portions 20M, 20R). Meanwhile, the inner through-holes 221f, 222f and the outer through-holes 231f, 232f of the base portion 20F may communicate respectively with corresponding through-holes formed in the adjacent base portions.

When the dehumidification performance required by a user is accomplished solely by the dehumidifier 11A, only the dehumidifier 11A may be mounted on the base portion 20F. When the dehumidification performance required by the user is accomplished by the dehumidifiers 11A, 11B, the dehumidifiers 11A, 11B are mounted on the base portion 20F.

When the user requires higher dehumidification performance, a manufacturer may connect the base portion 20F to the base portion 20M. The manufacturer may mount an additional dehumidifier (at least one of the dehumidifiers 11C, 11D) on the base portion 20M to meet the user's demand.

When the user requires much higher dehumidification performance, the manufacturer may connect the base portion 20R to the base portion 20M. The manufacturer may mount an additional dehumidifier (at least one of the dehumidifiers 11E, 11F) on the base portion 20R to meet the user's demand.

The inner through-holes 221f, 221m, 221r of the base portion 20F, 20M, 20R are communicated with each other to form the inlet channel 221. Likewise, the inner through-holes 222f, 222m, 222r of the base portion 20F, 20M, 20R are communicated with each other to form the other inlet channel 222. Likewise, the outer through-holes 231f, 231m, 231r of the base portion 20F, 20M, 20R are communicated with each other to form the outlet channel 231. Likewise, the outer through-holes 232f, 232m, 232r of the base portion 20F, 20M, 20R are communicated with each other to form the other outlet channel 232. Therefore, the compressed air may smoothly pass through the dehumidifying device 1 under a variety of combinations of the dehumidifying modules. When the compressed air passes through the dehumidifying device 1, the compressed air may be appropriately dehumidified.

The dehumidification performance of one dehumidifying module is determined by the dehumidifier 11. A designer may divide dehumidification performance required by a user by the dehumidification performance of the one dehumidifying module so as to obtain the number of dehumidifying modules. The manufacturer may manufacture a plurality of dehumidifying modules from a common design drawing. The manufacturer may then combine the dehumidifying modules on the basis of the designer's decision to the dehumidifying device 1. Therefore, the manufacturer may manufacture the dehumidifying device 1 having a variety of dehumidification performance without managing various dehumidifying modules. Accordingly, there is a large decrease in effort for production control of dehumidifying modules.

The compressed air successively passes through the inlet channels 221, 222, the dehumidifiers 11 and the outlet channels 231, 232. If there is a plurality of dehumidifiers 11 between the inlet channels 221, 222 and the outlet channels 231, 232, a flow of compressed air is split into a plurality of flows of the compressed air in accordance with the number of the dehumidifiers 11. Therefore, excessively high dehumidification performance is not required for each of the dehumidifiers 11.

The base portions 20F, 20M, 20R are connected to each other without tubes. Therefore, a set of the inner through-holes 221f, 221m, 221r and a set of the inner through-holes 222f, 222m, 222r respectively form the inlet channels 221, 222. Likewise, a set of the outer through-holes 231f, 231m, 231r and a set of the outer through-holes 232f, 232m, 232r respectively form the outlet channels 231, 232. Accordingly, a designer may set the entire length of the base including the base portions 20F, 20M, 20R (in the extension direction of the inlet channels 221, 222 and the outlet channels 231, 232) to a small value.

The dehumidifier 11 extends along the imaginary planes PPH intersecting with the inlet channels 221, 222 and the outlet channels 231, 232. Since there is little interference between the dehumidifiers 11 adjacent to each other, a designer may connect the base portions 20F, 20M, 20R to each other. Therefore, the designer may set the entire length of the base including the base portions 20F, 20M, 20R (in the extension direction of the inlet channels 221, 222 and the outlet channels 231, 232) to a small value. Accordingly, the dehumidifying device 1 may be placed even in a small installation space.

The base portions 20F, 20M, 20R are fastened to each other by the fastening screws 7. Therefore, a manufacturer may easily assemble the dehumidifying device 1.

The separation device 2 and the check valve 6 are mounted to the dehumidifying unit 10. The separation device 2 is mounted at the upstream of the dehumidifying unit 10. Therefore, the dehumidifying device 1 has high dehumidification performance. The check valve 6 is mounted at the downstream of the dehumidifying unit 10. Therefore, the compressed air after a dehumidification process is less likely to flow back to the dehumidifying unit 10. Therefore, there is appropriately operation of the dehumidifying device 1.

A person skilled in the art may design a variety of dehumidifying devices on the basis of the principle of the present embodiment.

The dehumidifying unit 10 uses the hollow fiber membranes 15 as the dehumidifiers 11. Alternatively, drying agents such as zeolite may be used as the dehumidifiers 11. The principle of the present embodiment is not limited to a specific structure of dehumidifiers 11.

Two dehumidifiers 11 are fixedly mounted on the base portion 20. Alternatively, one dehumidifier may be mounted on one base portion. Further alternatively, three or more dehumidifiers may be fixedly mounted on one base portion. The principle of the present embodiment is not limited by how many dehumidifiers are mounted on one base portion.

In the present embodiment, the outlet 22b (through-hole) of the upstream base portion 20 is brought into firm contact with the inlet 22a (through-hole) of the downstream base portion 20. Alternatively, a pipe may be situated between the outlet (through-hole) of the upstream base portion and the inlet (through-hole) of the downstream base portion. The principle of the present embodiment is not limited to a specific connection structure between base portions.

The dehumidifying device and the dehumidifying module described in the context of the aforementioned embodiment mainly include the following features.

A dehumidifying device according to one aspect of the aforementioned embodiment includes a base configured to define an inlet channel, through which first air flows, and an outlet channel, through which second air less humid than the first air flows; and a first dehumidifier including a first inlet in communication with the inlet channel and a first outlet in communication with the outlet channel, the first dehumidifier dehumidifying the first air between the first inlet and the first outlet to generate the second air. The base includes a first base portion configured to define a first inlet region, through which the first air flows, and a first outlet region, through which the second air flows; and a second base portion configured to define a second inlet region in communication with the first inlet region and a second outlet region in communication with the first outlet region. The first and second inlet regions form at least a part of the inlet channel. The first and second outlet regions form at least a part of the outlet channel.

According to the aforementioned configuration, since the first and second inlet regions form at least a part of the inlet channel whereas the first and second outlet regions form at least a part of the outlet channel, a manufacturer may attach an additional dehumidifier to the second base portion when a user requires higher dehumidification performance than dehumidification performance of the first dehumidifier for the dehumidifying device.

In the aforementioned configuration, the dehumidifying device may further include a second dehumidifier including a second inlet in communication with the inlet channel and a second outlet in communication with the outlet channel, the second dehumidifier dehumidifying the first air between the second inlet and the second outlet to generate the second air. The first dehumidifier may be attached to the first base portion. The second dehumidifier may be attached to the second base portion.

According to the aforementioned configuration, a manufacturer may attach the first and second dehumidifiers to the first and second base portions. Consequently, the dehumidifying device may have high dehumidification performance.

In the aforementioned configuration, the first base portion may define a first downstream opening as a downstream end of the first inlet region and a second downstream opening as a downstream end of the first outlet region. The second base portion may define a first upstream opening as an upstream end of the second inlet region and a second upstream opening as an upstream end of the second outlet region. The first base portion may be adjacent to the second base portion so that the first downstream opening communicates with the first upstream opening and the second downstream opening communicates with the second upstream opening.

According to the aforementioned configuration, since the first base portion is adjacent to the second base portion so that the first downstream opening communicates with the first upstream opening whereas the second downstream opening communicates with the second upstream opening, a designer may give the base small dimensional values.

In the aforementioned configuration, the first dehumidifier may extend along an imaginary plane intersecting with the inlet and outlet channels.

According to the aforementioned configuration, since the first dehumidifier extends along the imaginary plane intersecting with the inlet and outlet channels, there may be little interference with another dehumidifier next to the first dehumidifier. Consequently, a designer may give the base small dimensional values.

In the aforementioned configuration, the first base portion may be fastened to the second base portion by a fastening member extending through the first and second base portions.

According to the aforementioned configuration, since the first base portion is fastened to the second base portion by the fastening member extending through the first and second base portions, a manufacturer may easily manufacture the dehumidifying device.

In the aforementioned configuration, the dehumidifying device may further include a separator configured to separate moisture from the first air; and a check valve which allows passage of the second air in a first direction from the first inlet to the first outlet and blocks the second air from passing in a second direction opposite to the first direction. The first base portion may define an upstream opening as an upstream end of the inlet channel. The second base portion may define a downstream opening as a downstream end of the outlet channel. The separator may be connected to the upstream opening. The check valve may be connected to the downstream opening.

According to the aforementioned configuration, since the separator is connected to the upstream opening, the dehumidifying device may have high dehumidification performance. Since the check valve is connected to the downstream opening, the dehumidifying device may operate appropriately.

In the aforementioned configuration, the base may include a third base portion situated between the first and second base portions. The third base portion may define the inlet and outlet channels in cooperation with the first and second base portions.

According to the aforementioned configuration, since the third base portion defines the inlet and outlet channels in cooperation with the first and second base portions, a manufacturer may give the dehumidifying device appropriate dehumidification performance in light of a user's request for the dehumidification performance.

A dehumidifying module according to another aspect of the aforementioned embodiment is connectable to another base portion configured to define channels through which air flows. The dehumidifying module includes a base portion configured to define an inlet region, through which first air flows, and an outlet region, through which second air less humid than the first air flows; and a first dehumidifier including a first inlet in communication with the inlet region and a first outlet in communication with the outlet region, the first dehumidifier dehumidifying the first air between the first inlet and the first outlet to generate the second air. The inlet region communicates with one of the channels to partially define an inlet channel, through which the first air flows, and the outlet region communicates with another of the channels to define an outlet channel, through which the second air flows, when the base portion is connected to the other base portion.

According to the aforementioned configuration, since the inlet region communicates with one of the channels to partially define the inlet channel, through which the first air flows whereas the outlet region communicates with another of the channels to define the outlet channel, through which the second air flows, a manufacturer may connect the other base portion to the base portion so as to mount an additional dehumidifier when a user requests higher dehumidification performance than dehumidification performance of the first dehumidifier for the dehumidifying device.

INDUSTRIAL APPLICABILITY

The principle of the aforementioned embodiment is applicable to a variety of technical fields in which require air dehumidification.

This application is based on Japanese Patent Application No. 2014-134412 filed on Jun. 30, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A dehumidifying device, comprising:
   a base configured to define an inlet channel, through which first air flows, and an outlet channel, through which second air less humid than the first air flows; and
   a first dehumidifier including a first inlet in communication with the inlet channel and a first outlet in communication with the outlet channel, the first dehumidifier dehumidifying the first air between the first inlet and the first outlet to generate the second air,
   wherein each of the inlet and outlet channels is formed by continuously and linearly aligned through-holes, and
   wherein the base includes a first base portion configured to define a first inlet region including one of the through-holes of the inlet channel, through which the first air flows, and a first outlet region including one of the through-holes of the outlet channel, through which the second air flows; and
   wherein the base also includes a second base portion configured to define a second inlet region including the other of the through-holes of the inlet channel in communication with the first inlet region and a second outlet region including the other of the through-holes of the outlet channel in communication with the first outlet region.

2. The dehumidifying device according to claim 1, further comprising:
   a second dehumidifier including a second inlet in communication with the inlet channel and a second outlet in communication with the outlet channel, the second dehumidifier dehumidifying the first air between the second inlet and the second outlet to generate the second air,
   wherein the first dehumidifier is attached to the first base portion, and
   wherein the second dehumidifier is attached to the second base portion.

3. The dehumidifying device according to claim 1,
   wherein the first base portion defines a first opening as a first end of the first inlet region and a second opening as a second end of the first outlet region, the second end being opposite to the first end;
   wherein the second base portion defines a third opening as a third end of the second inlet region and a fourth opening as a fourth end of the second outlet region, the fourth end being opposite to the third end; and
   wherein the first base portion is adjacent to the second base portion so that the first opening communicates with the third opening and the second opening communicates with the fourth opening.

4. The dehumidifying device according to claim 1, wherein the first dehumidifier extends along an imaginary plane intersecting with the inlet and outlet channels.

5. The dehumidifying device according to claim 1, wherein the first base portion is fastened to the second base portion by a fastening member extending through the first and second base portions.

6. The dehumidifying device according to claim 1, further comprising:
- a separator configured to separate moisture from the first air; and
- a check valve which allows passage of the second air in a first direction from the first inlet to the first outlet and blocks the second air from passing in a second direction opposite to the first direction,
- wherein the first base portion defines an opening to which the separator is connected,
- wherein the second base portion defines an opening to which the check valve is connected.

7. The dehumidifying device according to claim 6,
- wherein the base includes a third base portion situated between the first and second base portions, and
- wherein the third base portion defines the inlet and outlet channels in cooperation with the first and second base portions.

8. A dehumidifying module connected to another base portion which defines channels through which air flows, comprising:
- a base portion configured to define an inlet region including a through hole, through which first air flows, and an outlet region including a through hole, through which second air less humid than the first air flows; and
- a first dehumidifier including a first inlet in communication with the inlet region and a first outlet in communication with the outlet region, the first dehumidifier dehumidifying the first air between the first inlet and the first outlet to generate the second air,
- wherein the inlet region communicates with one of the channels to partially define an inlet channel, through which the first air flows, and the outlet region communicates with another of the channels to define an outlet channel, through which the second air flows, when the base portion is connected to the other base portion,
- wherein the inlet region is continuously and linearly connected to a through hole formed in the other base portion, and
- wherein the outlet region is continuously and linearly connected to another through hole formed in the other base portion.

* * * * *